(12) United States Patent
Chin-Chien et al.

(10) Patent No.: US 9,351,374 B2
(45) Date of Patent: *May 24, 2016

(54) MULTI-MODE PHOTO-CONTROLLED LIGHT WITH TIMER CIRCUIT

(71) Applicant: Tyco Electronics Corporation, Berwyn, PA (US)

(72) Inventors: Wang Chin-Chien, Tao-Yuan (TW); Kao Wen-Chang, Tao-Yuan (TW)

(73) Assignees: CNL Lighting Corporation (TW); Tyco Electronics Corporation, Berwyn, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/484,437

(22) Filed: Sep. 12, 2014

(65) Prior Publication Data

US 2015/0002031 A1    Jan. 1, 2015

Related U.S. Application Data

(63) Continuation of application No. 13/206,578, filed on Aug. 10, 2011, now Pat. No. 8,836,246.

(30) Foreign Application Priority Data

Aug. 11, 2010  (TW) ............................... 99215360 A

(51) Int. Cl.
*H05B 37/02*  (2006.01)

(52) U.S. Cl.
CPC ........ *H05B 37/0218* (2013.01); *H05B 37/0281* (2013.01); *Y02B 20/42* (2013.01); *Y02B 20/46* (2013.01)

(58) Field of Classification Search
None
See application file for complete search history.

(56) References Cited

U.S. PATENT DOCUMENTS

| | | |
|---|---|---|
| 3,273,012 A | 9/1966 | Rosenblum |
| 4,005,334 A | 1/1977 | Andrews |
| 4,207,501 A | 6/1980 | Smallegan |
| 4,575,659 A * | 3/1986 | Pezzolo et al. ................ 315/159 |
| 4,988,921 A | 1/1991 | Ratner et al. |

(Continued)

OTHER PUBLICATIONS

"Non-Volatile Memory" *Wikipedia, the Free Encyclopedia*, Retrieved Jun. 2, 2010 from the World Wide Web: http://en.wikipedia.org/wiki/Non-volatile_memory, 6 pages.

*Primary Examiner* — Douglas W Owens
*Assistant Examiner* — Dedei K Hammond
(74) *Attorney, Agent, or Firm* — Myers Bigel & Sibley, P.A.

(57) ABSTRACT

A photo-controlled light includes an electrical power input port configured to receive electrical power, a light emitting unit that is connected to the electrical power input port and a photosensitive timer module that connects the light emitting unit to the electrical power input port. The photosensitive timer module includes a photosensitive switch unit including a photosensitive element that is configured to detect a light level that satisfies a luminosity threshold value, a timing switch unit coupled to the photosensitive switch unit that is configured to only connect the electrical power input port to the light emitting unit for a conduction time frame responsive to the photosensitive switch unit detecting that the light level is less than the luminosity threshold value so that the photosensitive timer module transmits electricity during the conduction time frame when the luminosity detected by the photosensitive element is less than the luminosity threshold value.

14 Claims, 4 Drawing Sheets

(56) References Cited

U.S. PATENT DOCUMENTS

| | | |
|---|---|---|
| D364,142 S | 11/1995 | Metcalfe et al. |
| 5,585,697 A | 12/1996 | Cote et al. |
| 5,789,868 A | 8/1998 | Sears |
| 5,823,660 A | 10/1998 | Hsu |
| 6,472,831 B1 | 10/2002 | Russo |
| 6,488,388 B2 | 12/2002 | Jones |
| 6,580,221 B2 | 6/2003 | Hutzler et al. |
| 6,820,998 B2 | 11/2004 | Chen |
| 6,824,296 B2 | 11/2004 | Souza et al. |
| 7,128,448 B2 | 10/2006 | Fischer et al. |
| 7,148,628 B2 | 12/2006 | McCavit et al. |
| 7,245,083 B2 | 7/2007 | Rodriguez |
| 7,339,790 B2 | 3/2008 | Baker et al. |
| 7,476,002 B2 | 1/2009 | Wolf et al. |
| 7,492,103 B2 * | 2/2009 | Hwang ............... 315/56 |
| 7,520,634 B2 | 4/2009 | Ducharme et al. |
| 7,520,635 B2 | 4/2009 | Wolf et al. |
| 7,521,872 B2 | 4/2009 | Bruning |
| 7,604,378 B2 | 10/2009 | Wolf et al. |
| 2006/0238136 A1 | 10/2006 | Johnson III et al. |
| 2008/0180036 A1 | 7/2008 | Garrity et al. |

\* cited by examiner

MULTI-MODE PHOTO-CONTROLLED LIGHT WITH TIMER CIRCUIT

RELATED APPLICATION(S)

The present application is a continuation application of U.S. patent application Ser. No. 13/206,578 entitled MULTI-MODE PHOTO-CONTROLLED LIGHT WITH TIMER CIRCUIT, filed Aug. 10, 2011, which claims the benefit of Taiwan Utility Model Application No. 099215360 (Patent No. M396557), filed Aug. 11, 2010, the disclosures of which are hereby incorporated herein by reference in their entireties.

BACKGROUND OF THE INVENTION

The present invention relates to photo-controlled lights.

A conventional photo-controlled light, such as Republic of China New Utility Model Patent No. M360187 "Bicycle Warning Light," includes a photoelectric switch that is connected between a power source and a light bulb, such that the photoelectric switch decides whether or not to close based on the degree of luminosity detected in the surrounding environment. By this means, the photoelectric switch assumes a closed position when light in the outside environment is insufficient and transmits electrical power provided by the power source to the light bulb, causing the light bulb to emit light, thereby providing the function of illumination. When there is sufficient light in the outside environment, the photoelectric switch assumes an open position and stops transmitting electrical power provided by the power source to the light bulb, thereby avoiding the waste of energy. By means of the above electrical circuit structure, a conventional photo-controlled light can be mechanically controlled based on the degree of luminosity in the outside environment and may achieve the goals of rapid response and effectively reducing electricity consumption.

However, the abovementioned conventional photo-controlled light still typically has the following drawback: on-off control of this kind of conventional photo-controlled light is generally limited to control based on the luminosity of the outside environment, and it does not provide the user with further automatic on-off control in accordance with how the light is used. For example: late at night, when the user no longer requires illumination, some conventional photo-controlled lights cannot be automatically turned off as desired so as to conserve energy. This wastes energy. In particular, with regard to a photo-controlled light that is not connected to the municipal power grid by power lines and which only utilizes solar or wind energy to generate and store electricity, the above drawback is more prone to resulting in the problem of insufficient electricity due to improper energy use, and may render the conventional photo-controlled light only capable of providing weak lighting when the user requires full illumination.

SUMMARY OF THE INVENTION

Some embodiments of the present invention provide a photo-controlled light that includes an electrical power input port configured to receive electrical power, a light emitting unit that is connected to the electrical power input port and a photosensitive timer module that connects the light emitting unit to the electrical power input port. The photosensitive timer module includes a photosensitive switch unit including a photosensitive element that is configured to detect a light level that satisfies a luminosity threshold value. The photosensitive timer module also includes a control switch and a timing switch unit. The timing switch unit is coupled to the photosensitive switch unit and is configured to only connect only the electrical power input port to the light emitting unit for a conduction time frame responsive to the photosensitive switch unit detecting that the light level is less than the luminosity threshold value so that the photosensitive timer module transmits electricity during the conduction time frame when the luminosity detected by the photosensitive element is less than the luminosity threshold value. The control switch has a first mode that connects the photosensitive switch unit and the timing switch unit to the electrical power input port and a second mode that connects the electrical power input port to the light emitting unit without passing through the photosensitive switch unit or the timing switch unit so that electricity is transmitted to the light emitting device regardless of the light level detected by the photosensitive switch unit.

DETAILED DESCRIPTION OF EMBODIMENTS OF THE INVENTION

Figure 1:
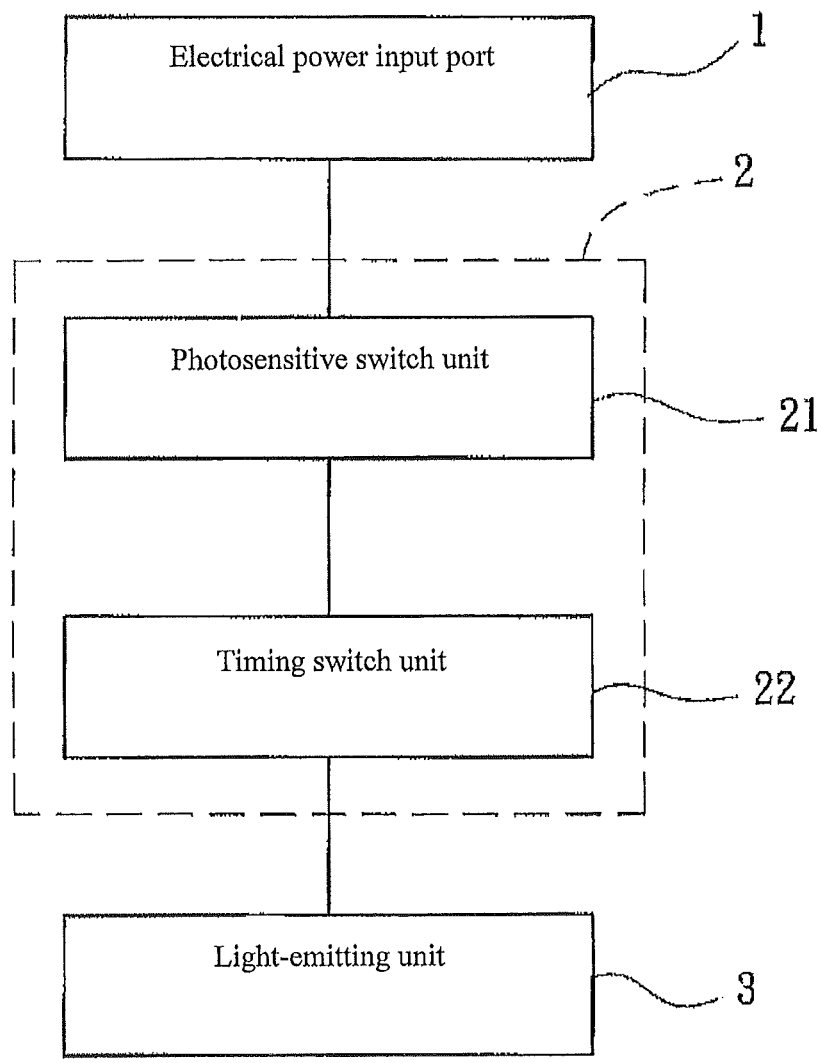
FIG. 1 is a schematic diagram of a photo-controlled light according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As will be further described herein, some embodiments of the present invention provide a photo-controlled light including an electrical power input port, a photosensitive timer module, and a light-emitting unit. The electrical power input port receives electrical power. The photosensitive timer module is connected in series to the electrical power input port. The photosensitive timer module possesses a photosensitive element and is provided with a luminosity threshold value and a conduction time frame. When the luminosity detected by the photosensitive element is less than the luminosity threshold value, the photosensitive timer module transmits the electrical power during the conduction time frame. The light-emitting element is connected in series to the photosensitive timer module. Thereby, the effect of conserving energy may be achieved.

Some embodiments provide a photo-controlled light that not only turns on and off automatically in accordance with the luminosity of the surrounding environment, but also such that its time of continuous operation may be controlled, which may achieve the goal of effectively conserving energy.

Some embodiments provide a photo-controlled light whose photo-control functionality or timer functionality can be turned off as needed by the user so as to provide modified modes of operation, which may achieve the goal of increased operational features.

To further clarify the above-described and other objectives, features, and advantages of the present work, some embodiments will be described below in combination with the attached drawings, a detailed description of which follows.

Figure 2:
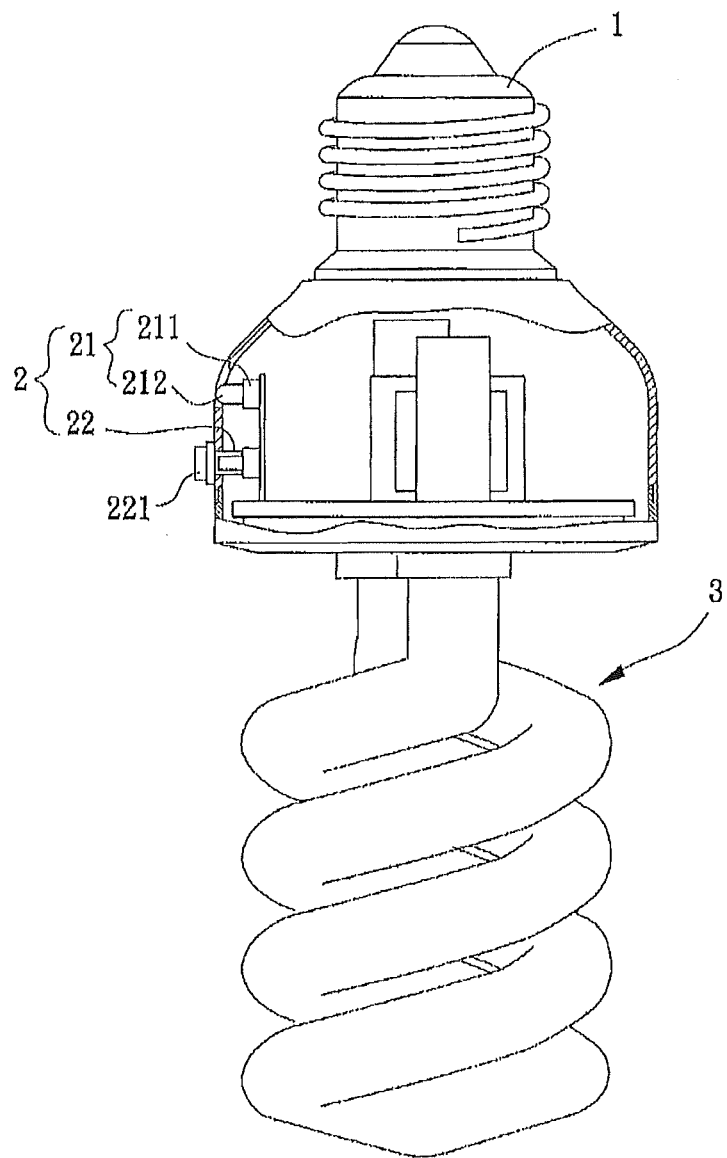
FIG. 2 is a partial cutaway side view of a photo-controlled light according to some embodiments of the present invention.

Referring first to FIG. 1, which is a schematic diagram of the photo-controlled light, and FIG. 2, which is the partially cutout side view of a photo-controlled light, some embodiments will be further described. In the embodiments of FIGS. 1 and 2, the photo-controlled light includes an electrical power input port 1, a photosensitive timer module 2 and a light-emitting unit 3. The electrical power input port 1, photosensitive timer module 2, and light-emitting unit 3 are connected, in this order, in series as seen in FIG. 1.

The illustrated electrical power input port 1 forms part of the surface of the photo-controlled light so as to receive electrical power used to drive the photo-controlled light; wherein, the shape of the electrical power input port 1 may be that of a spiral [screw] lamp base, as shown in FIG. 2, so as to connect to the municipal power grid; but it may be of any shape necessary to meet usage requirements, so as to work with various direct or alternating current power sources, such as dry cell batteries, solar power, wind power, and the like. In addition, when alternating current (such as that supplied by the municipal power grid) is desired as the power source for the photo-controlled light of the present invention, the electrical power input port 1 may be additionally provided with a rectifier to rectify the current and stabilize the voltage of the input electricity.

The photosensitive timer module 2 is electrically connected to the electrical power input port 1, so as to transmit electricity from the electrical power input port 1. The photosensitive timer module 2 includes a photosensitive switch unit 21 and a timing switch unit 22. The photosensitive switch unit 21 and the timing switch unit 22 are connected in series; wherein, as shown in FIG. 1, the photosensitive switch unit 21 can be connected to the electrical power input port 1 and the timing switch unit 22 can be connected to the light-emitting unit 3. Specifically, in the embodiments depicted in FIG. 1 and FIG. 2, the photosensitive switch unit 21 includes an electronic switch 211 and a photosensitive element 212. The electronic switch 211 is connected in series to the timing switch unit 22 and the photosensitive element 212 is externally exposed on the surface of the photo-controlled light while being electrically connected to the electronic switch 211. By this means, when the photosensitive element 212 detects that luminosity in the external environment of the photo-controlled light is less than the luminosity threshold value, the electronic switch 211 is moved into the closed position, thereby transmitting electricity to the timing switch unit 22. If the luminosity in the external environment of the photo-controlled light is not less than the luminosity threshold value, the photosensitive element 212 causes the electronic switch 211 to open, stopping the transmission of electricity to the timing switch unit 22. Therefore, the photosensitive switch unit 21 can determine based on the luminosity of the external environment when to supply electricity to the timing switch unit 22.

The timing switch unit 22 is configured to have a conduction time frame. The illustrated timing switch unit 22 includes a time-setting element 221 so that the user can set the conduction time frame, thereby determining the length of time that electricity, after it is initially transmitted to the timing switch unit 22, can be transmitted through the timing switch unit 22. The conduction time frame can be limited, for example, as follows: unlimited, limited to 2 hours, limited to 5 hours, or limited to 8 hours, etc. In some embodiments, an electronic clock may be included in the timing switch unit 22 and the conduction time frame could be a duration between a first moment and a second moment, so as to allow the user to employ the time-setting element 221 to set a first moment and a second moment of the conduction time frame, thereby deciding the timer period when electricity is permitted to pass through the timing switch unit 22. For example, the conduction time frame may be limited as follows: every evening from 7 p.m. to 12 midnight or, on every work day during the week, from 7 p.m. to 10 p.m., etc.

The light-emitting unit 3 is electrically connected to the timing switch unit 22 of the photosensitive timer module 2 such that, when the electronic switch 211 is in the closed position during the conduction time frame, electricity from the electrical power input port 1 is received through the photosensitive timer module 2, and light is thereby generated. In addition, to allow the light-emitting unit 3 to produce a stable light source, the light generated by the light-emitting unit 3 so that it does not impinge on the photosensitive element 212 in a manner affecting the detection of a low external light level so as to avoid having the photosensitive element 212, as a result of detecting the light emitted by the light-emitting unit 3, turn off the electronic switch 211, a configuration that could cause the electronic switch 211 to switch on and off continuously.

As such, the photo-controlled light of the embodiments of FIGS. 1 and 2 not only turns on and off automatically in accordance with the luminosity of the surrounding environment, it may also provide the ability to adjust the conduction time frame of the timing switch unit 22 in accordance with the user's desire, thereby controlling the continuous operating time of the photo-controlled light. Therefore, the photo-controlled light may achieve the effect of greater energy conservation, compared to a conventional photo-controlled light.

Figure 3:
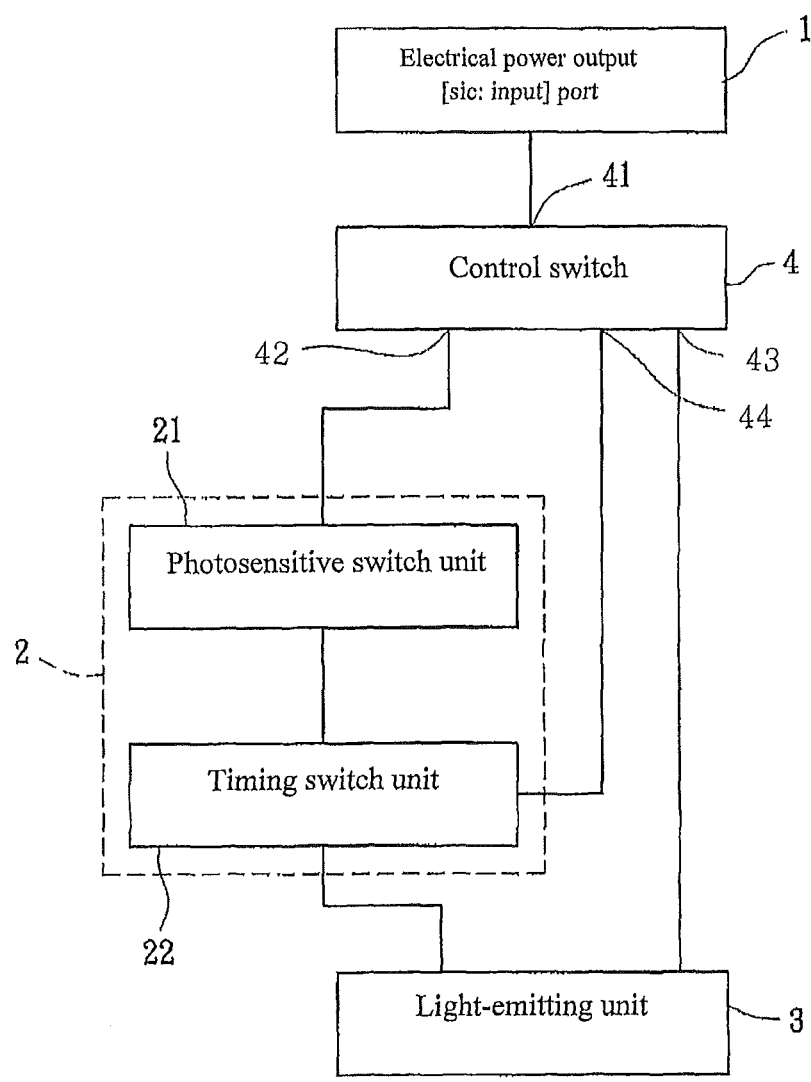
FIG. 3 is a schematic diagram of a photo-controlled light according to further embodiments of the present invention.
Figure 4:
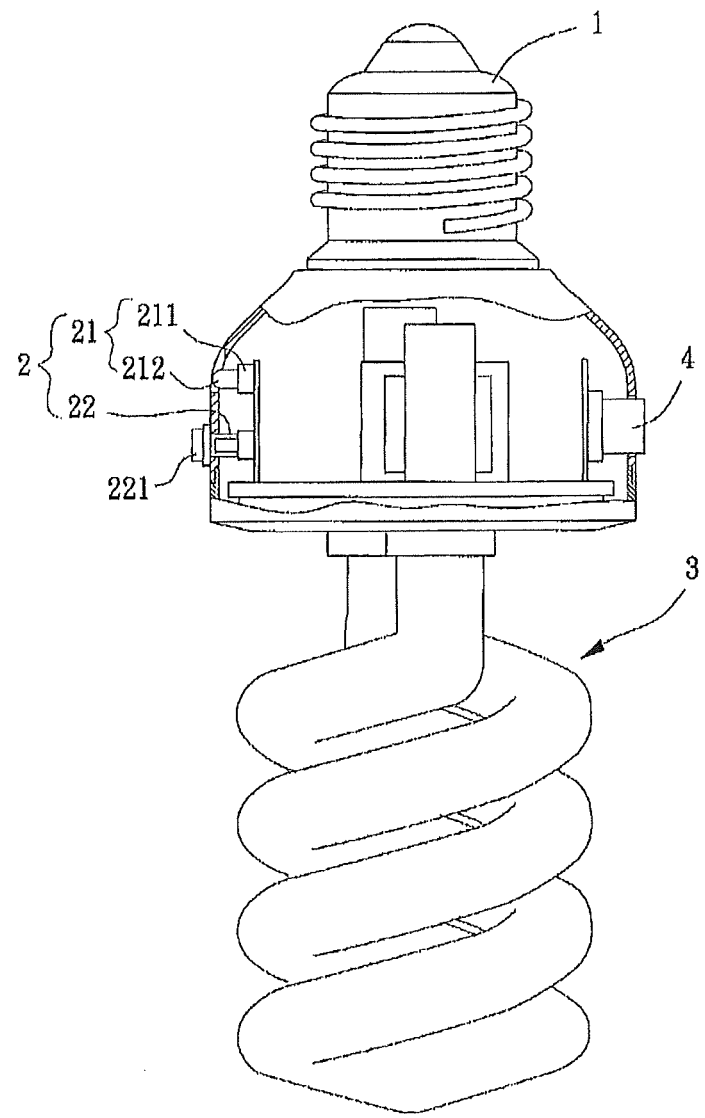
FIG. 4 is a partial cutaway side view of a photo-controlled light according to further embodiments of the present invention.

FIG. 3 and FIG. 4 are, respectively, a schematic diagram and a side-view unit-assembly drawing of further embodiments of a photo-controlled light. In comparison with the embodiments of FIGS. 1 and 2, the photo-controlled light in FIGS. 3 and 4 further includes a control switch 4 connected in series between the electrical power input port 1 and the photosensitive timer module 2. The control switch 4 may be a single-input, multiple-output selector switch. Specifically, the illustrated control switch 4 has an electrical power input terminal 41, a first electrical power output terminal 42, and a second electrical power output terminal 43.

Depending upon the mode of operation of the control switch 4, the electrical power input terminal 41 is electrically connected to either the first electrical power output terminal 42 or the second electrical power output terminal 43. With regard to connections among the other components, the electrical power input terminal 41 is connected to the electrical power input port 1; the first electrical power output terminal 42 is connected to the photosensitive switch unit 21 of the photosensitive timer module 2; and the second electrical power output terminal 43 is connected to the light-emitting unit 3. Thereby, by controlling the relationship of electrical connections between the electrical power input terminal 41 and the two electrical power output terminals 42 and 43 (the mode of the control switch), it is possible to determine whether electricity received by the electrical power input port 1 has to be transmitted via the photosensitive timer module 2 to the light-emitting unit 3. In other words, when electrical power input terminal 41 is electrically connected with the first electrical power output terminal 42, the photosensitive timer module 2 and the light-emitting unit 3 of the present embodiment operate as described with reference to FIGS. 1 and 2. When the electrical power input terminal 41 is electrically connected to the second electrical power output terminal 43, electricity from the electrical power input port 1 is transmitted directly to the light-emitting unit 3 via the control switch 4, causing the photo-control functionality and timing functionality of the photo-controlled light activation to be bypassed, thus letting the photo-controlled light operate like a standard light.

As also shown in FIG. 3, in some embodiments, the control switch 4 of the photo-controlled light may additionally possess a third electrical power output terminal 44, with the electrical power input terminal 41 being electrically connected to the first electrical power output terminal 42, the second electrical power output terminal 43, or the third electrical power output terminal 44. The third electrical power output terminal 44 is connected to the timing switch unit 22 of the photosensitive timer module 2. When the electrical power input terminal 41 is electrically connected to the third electrical power output terminal 44 (in a third mode of the control switch 4), the photo-control functionality of the photo-controlled light of the present work can be bypassed, thereby causing the timing switch unit 22 to prevent the light-emitting unit 3 from receiving electricity and emitting light except during the conduction time frame. In such embodiments, it will be understood that the timing switch unit will be configured to operate as it would responsive to a low light level of light detected by the photosensitive switch unit 21, for example, by inputting a appropriate light level detected input directly to the timing switch unit 22.

By means of the above described control switch 4, some embodiments of the photo-controlled light can not only, as in the photo-controlled light of FIGS. 1 and 2, provide automatic on-off functionality based on the luminosity of the environment and timing functionality, responsive to luminosity of the environment or not, but also provides the user with the option of disabling (turning off) the photo-control or timing functionality as desired, thereby having the effect of increasing the operational features of the photo-controlled light.

As described above, the photo-controlled light of FIGS. 1 and 2 may have multiple modes of operation under photo-control, such as unlimited time (i.e., whenever a low enough level of external light is detected), limited to 2 hours, limited to 5 hours or limited to 8 hours or the like, which may be set by a user with the time-setting element 221. The embodiments of FIGS. 3 and 4 may provide additional modes. In some embodiments, a memory feature is provided to retain a memory of which of these modes has been selected even when power is lost to the light (i.e. no power is available on the input port 1). In such embodiments, a user may benefit by, for example, being able to program the light in their home and then simply install the light in an outside/hard to access fixture, which may ease programming of the light.

Some embodiments may further include a visible indicator light for a user, which may be proximate the time-setting element 221. For example, a light emitting diode (LED), such as a blue LED may provide various features. In some embodiments, the LED may be used with three different contexts. First, when the photo-controlled light (lamp) is being programmed the LED may flash indicating what mode the lamp is set to. For example, for the four mode example described above, mode 1 (dusk to dawn operation) may be selected by pushing the time-setting element 221 one time and the LED will flash one time. Mode 2 (lamp comes on at dusk and operates for 2 hours) may be selected by pushing the time-setting element 221 two times and the LED will flash two times. Mode 3 (lamp comes on at dusk and operates for 5 hours) may be selected by pushing the time-setting element 221 three times and the LED will flash three times. Mode 4 (lamp comes on at dusk and operates for 8 hours) may be selected by pushing the time-setting element 221 four times and the LED will flash four times.

When the lamp is programmed by the time-setting element 221 in some embodiments, a selected time after completing programming, such as five seconds after the last LED flash described above, the LED will flash one more time indicating that the mode has been set and saved into memory. When the LED flashes the last time to indicate that the mode has been set and saved in memory the LED operate in several ways in different embodiments. For example, if the lamp is programmed to unlimited mode the LED will remain off. If the lamp is programmed in a Time Set mode the LED will remain on. Such embodiments may provide the user a way to tell if the lamp is in time set mode or unliited mode visually.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A photo-controlled light, comprising:
an electrical power input port configured to receive electrical power;
a light emitting unit that is connected to the electrical power input port; and
a photosensitive timer module that connects the light emitting unit to the electrical power input port, wherein the photosensitive timer module includes:
a photosensitive switch unit including a photosensitive element that is configured to detect a light level that satisfies a luminosity threshold value; and
a timing switch unit coupled to the photosensitive switch unit that is configured to only connect the electrical power input port to the light emitting unit for a conduction time frame responsive to the photosensitive switch unit detecting that the light level is less than the luminosity threshold value so that the photosensitive timer module transmits electricity during the conduction time frame when the luminosity detected by the photosensitive element is less than the luminosity threshold value,
wherein the timing switch unit is configured to operate in a plurality of modes including an unlimited time mode and at least one limited time mode, and
wherein the timing switch unit further includes a time-setting element positioned on an outer surface of the photo-controlled light that is configured to allow a user to select one of the plurality of modes of the timing switch unit.

2. The photo-controlled light of claim 1, wherein the at least one limited time mode includes a limited to 2 hours mode, a limited to 5 hours mode and a limited to 8 hours mode.

3. The photo-controlled light of claim 1, further comprising a control switch having a first mode that connects the photosensitive switch unit and the timing switch unit to the electrical power input port and a second mode that connects the electrical power input port to the light emitting unit without passing through the photosensitive switch unit or the timing switch unit.

4. The photo-controlled light of claim 3, wherein the control switch further includes a third mode that connects the electrical power input port to the timing switch unit without passing through the photosensitive switch unit so that electricity is transmitted to the light emitting device for the conduction time frame regardless of the light level detected by the photosensitive switch unit.

5. The photo-controlled light of claim 3, wherein the control switch is connected in series between the electrical power input port and the photosensitive timer module.

6. The photo-controlled light of claim 5, wherein the control switch includes an electrical power input terminal, a first electrical power output terminal, and a second electrical power output terminal.

7. The photo-controlled light of claim 6, wherein the electrical power input terminal is electrically connected to the first electrical power output terminal in the first mode or the second electrical power output terminal in the second mode.

8. The photo-controlled light of claim 6, wherein the first electrical power output terminal is connected to the photosensitive timer module, and the second electrical power output terminal is connected to the light-emitting unit.

9. The photo-controlled light of claim 6,
wherein the control switch includes a third electrical power output terminal, the electrical power input terminal being electrically connected to the first electrical power output terminal in the first mode, the second electrical power output terminal in the second mode, or the third electrical power output terminal in a third mode of the control switch.

10. The photo-controlled light of claim 9, wherein the third electrical power output terminal is connected to the timing switch unit of the photosensitive timer module to configure the timing switch unit to transmit electricity regardless of the light level detected by the photosensitive switch unit.

11. The photo-controlled light of claim 1, wherein the timing switch unit is connected to the light-emitting unit.

12. The photo-controlled light of claim 1, wherein the photosensitive timer module includes a time-setting element configured to set the conduction time frame.

13. The photo-controlled light of claim 1, wherein the photosensitive switch unit is connected to the electrical power input port.

14. The photo-controlled light in of claim 13, wherein the photosensitive switch unit includes an electronic switch, the electronic switch being connected in series with the timing switch unit and electrically connected to the photosensitive element.

* * * * *